(12) United States Patent
Seidel et al.

(10) Patent No.: US 10,215,510 B2
(45) Date of Patent: Feb. 26, 2019

(54) METHOD FOR PROCESSING HEATED MATERIAL

(71) Applicant: SMS Group GmbH, Duesseldorf (DE)

(72) Inventors: Juergen Seidel, Kreuztal (DE); Peter Sudau, Hilchenbach (DE); Denis Anders, Siegen (DE); Johannes Alken, Siegen (DE); Matthias Kipping, Herdorf (DE)

(73) Assignee: SMS Group GmbH, Duesseldorf (DE)

( * ) Notice: Subject to any disclaimer, the term of this patent is extended or adjusted under 35 U.S.C. 154(b) by 229 days.

(21) Appl. No.: 15/035,616

(22) PCT Filed: Sep. 11, 2014

(86) PCT No.: PCT/EP2014/069341
§ 371 (c)(1),
(2) Date: May 10, 2016

(87) PCT Pub. No.: WO2015/071004
PCT Pub. Date: May 21, 2015

(65) Prior Publication Data
US 2016/0282063 A1  Sep. 29, 2016

(30) Foreign Application Priority Data
Nov. 12, 2013 (DE) .......... 10 2013 223 040

(51) Int. Cl.
*F28F 9/20* (2006.01)
*B21B 45/00* (2006.01)
*B65G 13/00* (2006.01)

(52) U.S. Cl.
CPC .............. *F28F 9/20* (2013.01); *B21B 45/008* (2013.01); *B65G 13/00* (2013.01); *Y02P 70/127* (2015.11); *Y02P 70/129* (2015.11)

(58) Field of Classification Search
CPC .................................. F28F 9/20; B65G 13/00
See application file for complete search history.

(56) References Cited

U.S. PATENT DOCUMENTS

| | | | |
|---|---|---|---|
| 3,662,998 A * | 5/1972 | Stratton ................ | C22B 5/16 266/147 |
| 3,893,504 A * | 7/1975 | Gaines, Jr. ............ | F28B 1/02 165/145 |
| 4,382,374 A | 5/1983 | Kopineck | |

(Continued)

FOREIGN PATENT DOCUMENTS

| CN | 101580703 | 11/2009 |
|---|---|---|
| EP | 0059093 | 9/1982 |

(Continued)

*Primary Examiner* — Nathaniel Herzfeld
(74) *Attorney, Agent, or Firm* — Abelman, Frayne & Schwab

(57) ABSTRACT

The invention relates to a method for processing heated material (1), wherein the material is guided along a conveying path and is covered and protected against heat loss in the region of the conveying path by at least one reflector element (2), wherein the reflector element (2) is cooled by means of a liquid. According to the invention, in order to guarantee efficient cooling of the reflector without costly measures, the liquid is glycol or comprises glycol or the liquid is alcohol or comprises alcohol or the liquid is thermal oil.

11 Claims, 6 Drawing Sheets

(56) References Cited

U.S. PATENT DOCUMENTS

Figure 1:
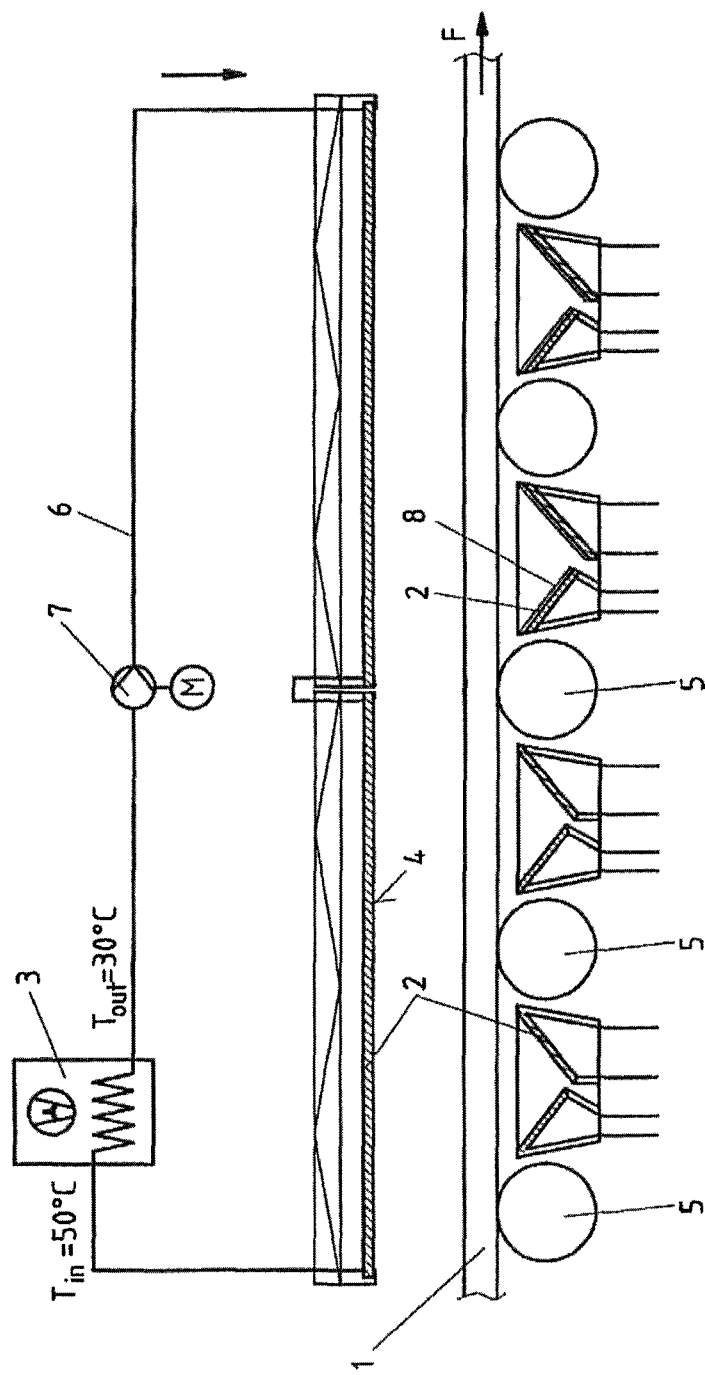

| | | | |
|---|---|---|---|
| 4,463,585 A | 8/1984 | Laws | |
| 4,527,409 A * | 7/1985 | Ouwerkerk | B21B 45/008 72/202 |
| 4,595,358 A * | 6/1986 | Ginzburg | B21B 45/008 432/65 |
| 4,604,054 A * | 8/1986 | Smith | B23K 1/0053 431/328 |
| 4,883,424 A * | 11/1989 | Sakai | C30B 31/12 432/121 |
| 5,919,561 A * | 7/1999 | Fuchs | C23C 28/00 428/215 |
| 6,225,609 B1 * | 5/2001 | Imanari | B21B 37/76 164/154.6 |
| 2004/0074451 A1 * | 4/2004 | Suenaga | F28D 7/16 122/6.6 |
| 2004/0092088 A1 * | 5/2004 | Abe | H01L 21/67115 438/535 |
| 2006/0021582 A1 * | 2/2006 | Saito | H01L 21/67109 118/724 |
| 2008/0041836 A1 * | 2/2008 | Gralenski | C23C 16/4411 219/156 |

FOREIGN PATENT DOCUMENTS

| | | |
|---|---|---|
| EP | 1377125 | 1/2004 |
| EP | 1808501 | 7/2007 |
| FR | 1416688 | 9/1965 |
| JP | 621806 | 1/1987 |
| JP | 6261763 | 3/1987 |

* cited by examiner

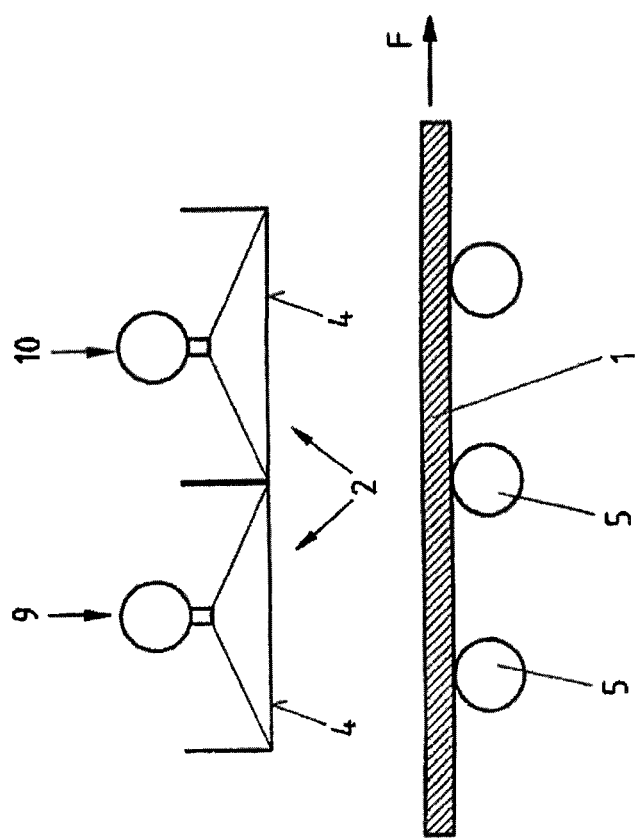

METHOD FOR PROCESSING HEATED MATERIAL

The invention relates to a method for processing heated material, wherein the material is guided along a conveying path and is covered and protected against heat loss in the region of the conveying path by at least one reflector element, wherein the reflector element is cooled by means of a liquid.

Such a method is known from EP 0 084 902 B1. From this document it is known, during the hot rolling of steel, to protect products being rolled against heat loss by means of a heat shield, wherein the heat shield has a radiation heat reflection surface. It is provided that the heat shield is cooled during use in order to maintain the reflectivity of the shield.

In general, warm thick or thin slabs, sheets, strips or other hot materials give off energy to the surrounding environment during transport. In order to reduce these temperature losses, heat-insulating hoods are used, which are disposed above or below or even next to the hot material. Heat-insulating hoods can be used, for example, within and downstream of a continuous casting system, downstream of a CSP furnace, between a roughing train and a finishing train, in the region of a coil box (side insulation) and within a finishing train.

In this connection, different heat-insulating principles exist. In one, heat can be absorbed, thereby heating a heat-insulating surface. In another, heat can be reflected back onto the hot material.

Heat-insulating hoods are disclosed, for example, in EP 0 005 340 A1, EP 0 059 093 B1 and U.S. Pat. No. 4,595,358. Most heat-insulating hoods are made primarily of ceramic fibers and thin metal membranes, which heat up rapidly when acted on by the heat from the hot material, thereby reducing the flow of heat from the material to the environment. In this process, the ceramic fibers and the metal membranes are exposed to high temperatures and to wide temperature variations. Although high-grade, highly temperature-resistant materials are used, their service life is limited, resulting in correspondingly high maintenance requirements and high maintenance costs. Furthermore, with discontinuous conveyance (changes between rolling periods and idle periods), the insulating effect is poor to some extent. The insulating hood surface, which is cooled during the idle period, must be reheated each time the hot material (for example a rough strip) is positioned below the heat-insulating hood, in order to achieve an insulating effect.

One embodiment of an insulating hood in the form of a thermal radiation reflector is disclosed by EP 0 032 536 B1. According to this embodiment, a thermal radiation reflector has a low absorption capacity and is embodied in the form of circular arc or elliptical arc pieces. Since the reflector plates are not cooled, they oxidize very rapidly and as a result of the high thermal load, they rapidly lose their good reflectivity, which causes problems.

In the method mentioned in the introductory part, as described in EP 0 084 902 B1, it is found to be disadvantageous that cooling is carried out by means of a low water temperature (less than 100° C.), which results in very easy evaporation of the water that is used for cooling. For that reason, measures are addressed that are designed to increase the temperature difference between the coolant (water) and the reflector, in which special insulating material is provided. However, this is in turn associated with corresponding costs.

Furthermore, if the reflector temperature is too low, this will result in condensation of water vapor in the region of the reflector surface, which has a negative impact on reflectivity.

It is therefore the object of the invention to improve upon a method of the type described in the introductory part such that reflection can take place in an optimal manner and reflectivity maintained to the greatest possible extent during operation, to enable costly measures to be dispensed with while at the same time ensuring efficient cooling of the reflector.

The attainment of this object by the invention is characterized in that the liquid is glycol or comprises glycol, or in that the liquid is alcohol or comprises alcohol, or in that the liquid is thermal oil.

In addition, during cooling, the liquid is preferably cooled only to the maximum temperature at which it does not have any vapor pressure.

The liquid is preferably a mixture of glycol and water.

The liquid can be conducted in a closed circuit through the reflector element, in which it travels past at least one heat exchanger. The liquid is preferably conducted in the closed circuit through a heat accumulator element.

It has proven advantageous for the liquid to be held at a predefined temperature in a controlled manner as it passes through the closed circuit. The volumetric flow rate of the liquid through the circuit can be used as a control variable. The temperature of the liquid is preferably regulated so as to keep it between 80° C. and 400° C. The temperature of the liquid is preferably further regulated so as to keep the liquid from evaporating. Thus the temperature level of the liquid should preferably be high enough that the liquid will not evaporate and no vapor pressure will build up in the operating temperature range as the liquid passes through the reflector element. The liquid should preferably also be non-combustible.

The heat drawn from the heat exchanger by the liquid can be fed to a secondary process, to further utilize this heat. In this process, heat recovery can particularly be carried out, or a conversion into electric current.

Once a predetermined period of use has elapsed, the at least one reflector element can be subjected to a cleaning process, to keep the surface of the reflector clean and functioning properly. According to a preferred embodiment, this cleaning can comprise blowing the reflector surface with a gas, in particular air, to prevent dirt and mist from being deposited there. Another preferred option involves cleaning the reflector surface using mechanical means, in particular a cleaning brush. The reflector surface can also be cleaned using liquid and/or chemical cleaning agents, in particular ethanol or nitric acid or a mixture of cleaning agents and water.

The reflective or mirror material that is used preferably has a reflectivity of at least 70%. Pure aluminum containing more than 99% aluminum has proven advantageous for use as the reflective or mirror material. It has further proven advantageous for material that acts in a thermal radiation range having a wavelength of between 0.5 and 10 μm to be used as the reflective or mirror material.

The invention is therefore based particularly on the use of glycol as the coolant, which can be used or operated at a higher temperature than water, without evaporating in the reflector region. This enables the dew point temperature to be exceeded in a defined manner. Special measures to increase the difference in temperature between the coolant (glycol) and the reflector—specifically the use of special insulating materials—are advantageously unnecessary.

The advantage of the glycol or glycol/water mixture that is used is that it also provides protection against frost, which is particularly advantageous in the case of closed heat exchanger systems.

The reflectors are preferably cooled in the closed cooling circuit, which in most cases comprises the main components of pump, reflector, and heat exchanger for removing the heat absorbed from the reflector, and the associated lines and measuring elements required for regulation. A heat accumulator can also be disposed within the cooling circuit.

During cooling, the temperature of the reflector element (mirror) and of the coolant can be monitored indirectly by measuring and regulating the volume of coolant and by measuring the coolant temperatures within the coolant transport circuit, or upstream and/or downstream of the internally cooled reflector. In this process, the correlation between the coolant temperatures and the reflector surface temperature, as well as between the measured coolant temperatures and the boiling point of the cooling liquid, in particular the glycol, inside the reflector, is preferably factored in mathematically. The process parameters are monitored accordingly and held within permissible limits.

In particular, the temperature of the liquid is regulated such that the liquid will not evaporate and vapor pressure will not build up as the liquid passes through the reflector element.

Advantageously, the external reflector cooling system can also be used, along with an alternative use of the reflector cooling device as a roughed strip cooler, optionally for only a portion of the device. Using the device as a roughed strip cooler allows the volume of coolant to be increased and enables the reflectors to be moved or pivoted out of the rolling line.

The reflectors can be arranged angled in the lower region, enabling any scales that may drop off to be removed by a combination of vibrating and blowing off, keeping the reflector surface clean.

The following is noted with regard to the glycol that is used. (Mono-)ethylene glycol (MEG), which is known by the common name glycol, is preferably used. This is the simplest dihydric alcohol with the chemical name ethane-1,2-diol. It is the simplest vicinal diol (methanediol or formaldehyde hydrate is a geminal diol). Furthermore, the designation glycols is used for two classes of diols derived from ethylene glycol. One involves 1,2-diols, such as 1,2-propanediol. The other involves α,ω-diols, which are produced by condensation of ethylene glycol. Examples include diethylene glycol (DEG) and triethylene glycol (TEG).

Radiant heat reflecting insulating hoods the following advantages over heat absorbing insulating hoods:

The heat-insulating action is effected immediately. The slow heating of the insulating hood surface (for example in the form of a membrane sheet) after an idle period is eliminated.

With a suitable reflective material and suitable working conditions, the functioning is highly efficient. Advantageously, the reflective material has a reflectivity of greater than 70%.

Since the majority of the heat radiation is reflected, the temperature load on the insulating hood is relatively low.

The service life of the reflective insulating hood is longer, and the maintenance expenditure is lower than that of the absorptive insulating hood.

To utilize the effect of a heat radiation reflector and to be able to obtain the characteristics thereof, the reflector or the mirror should be made of a suitable material having good reflection properties. The material should be protected against excess heat stress and thus against oxidation or destruction. In addition, the surface of the reflector should be cleaned from time to time or protected against soil deposits.

Various measures have proven effective in achieving this.

Glass mirrors equipped with safety glass and an aluminum reflective layer, for example, can be used as the reflective or mirror material. Metal mirrors made of stainless steel, bronze, copper, nickel or aluminum sheets, or mirrors having an aluminum, aluminum/copper, nickel or chromium coating or a coating of multiple materials, which preferably function in the wavelength range of the heat radiation ($\lambda$=0.5 to 10 µm), may also be used. Metal sheets or other non-metallic materials are preferred options as substrates for a coating. Such a coating can be a thin coating or an applied film.

The mirror surface may also be made, for example, of sheet aluminum, preferably pure aluminum having an aluminum fraction of greater than 99%, and embodied as matte, rolled, simply cleaned (which is cost-effective) or chemically (for example using HNO3) or mechanically polished.

The surface can be provided without or with a coating, in particular a vacuum coating, a lacquer seal, anodizing, treatment with oxidation inhibitors or other protective measures.

To ensure that the reflector or the mirror will be able to withstand the temperature load over the long term (for example, aluminum melts at about 660° C.) and the surface will not oxidize, the reflector surface is cooled on the side that faces away from the hot material (slab, roughed strip). The reflective or mirrored side of the reflector is thus held, for example, to a maximum temperature of less than 400° C., and should be greater than 80° C. if possible.

The reflective surfaces of an insulating path consisting of a plurality of units are preferably cooled symmetrically in relation to the path as a whole, to prevent a non-uniform insulating effect from developing over the width of the product. To accomplish this, the coolant can be introduced from both sides and discharged at the center, symmetrically, for example, or can be conducted alternately in one insulating path from the drive side to the operating side and in the next insulating path in reverse, from the operating side to the drive side.

In this case, the reflector or mirror can be embodied as a heat exchanger and can be cooled partially or completely from the inside. Alternatively, the reflector plate or mirror plate can be impinged on the rear side by the cooling medium, for example sprayed, and thus cooled.

The energy from the cooling medium can optionally be delivered to a heat recovery system. The residual heat, which is used for cooling the reflector, can also be used for other heat-consuming processes.

The cooling system is optimally controlled using a process model such that, in complying with the process and system limits, a high coolant temperature is set or a minimal coolant volume is used wherever possible, to keep the amount of pumping energy expended low. In addition, the coolant volume of the coolant pump(s) or the valve positions for cooling the reflective heat-insulating hood is also adjusted based on the following conditions, for example:

the quantity of heat radiated in or the product width and product temperature;

whether or not the product is under the heat-insulating hood (if no heat source, i.e. no product or material, is present under the insulating hood, the coolant pump can be deactivated) or whether the heat from a heat accumulator is used;

the measured temperature of the leading and trailing cooling medium;

the pressure level measured in the heat exchanger (in the case of a closed system);

the reflector surface temperature measured at selected locations.

The cooling system or the quantity of heat that is radiated in can further be monitored by measuring the temperature of the leading and trailing cooling media and by regulating the volume of cooling medium, the coolant temperature or indirectly, the temperature of the mirror surface. In this manner, a possible soiling of the mirror surface can also be detected by comparison with a reference condition and by deriving or detecting any necessary maintenance therefrom.

To maintain good reflective characteristics, the reflective layer (mirror) of the heat-insulating hood should be kept as free as possible from soil particles. For this purpose, the following possible measures are preferred:

A manual or automatic cleaning, treatment or polishing of the mirror surface using a cleaning device (for example, a cleaning brush) may be carried out during breaks in production.

The cleaning device can be installed fixedly adjacent to the reflective heat-insulating hood path or can consist of an external unit.

A dry or a moist rotatable cleaning roller may be used, which is moved along the reflective insulating hood surfaces (similar to a car washing system). The shape of the cleaning rollers is preferably configured to match the shape of the mirror (straight or curved). The cleaning roller can be equipped with hard or soft bristles or fabric strips, or may have a layer of foam rubber.

Cleaning can be carried out dry or using water and cleaning agent (e.g. ethanol), a mixture of water and cleaning agent, or a chemical cleaning agent (e.g. nitric acid).

Chemical or mechanical repolishing or sanding may likewise be carried out from time to time.

It is also possible for a low-pressure or high-pressure air flow to be constantly or intermittently generated along or toward the mirror surface on the product side.

It is also important for the use of sprayed water and a formation of steam in the region of the reflectors to be avoided. To accomplish this, transport-roller internal cooling, transverse spraying devices or fans may be used.

If splashing water or steam is expected, the mirror unit should be (temporarily) removed from the production line.

A membrane sheet, a cooled glass plate or some other type of protective plate can also be disposed in front of the mirror surface.

Embodiment examples of the invention are represented in the set of drawings. The drawings show:

FIG. 1 a schematic side view of a portion of a conveyor element for hot material to be rolled, with reflector elements disposed above and below the material for the purpose of radiating heat back onto the material, FIG. 2 a schematic plan view of the conveyor element according to FIG. 1, FIG. 3 a schematic view of a reflector element, as viewed in the conveying direction of the material, FIG. 4*a* to FIG. 4*f* schematically different embodiments of reflector elements, as viewed in cross-section through the heat exchanger, in the conveying direction of the material, FIG. 5 a reflector element together with the cooling device, as viewed in the conveying direction of the material, and FIG 6 the reflector element according to FIG. 5, from a side view.

FIG. 1 shows hot material 1 in the form of a slab, being conveyed in conveying direction F. A roller conveyor 5 is provided for this purpose. Both above and below slab 1, that is to say between two rollers of roller conveyor 5, reflector elements 2 are provided for reflecting back the heat from hot slab 1. Reflector elements 2 are embodied accordingly as reflective heat-insulating hoods, which are also connected to a heat exchanger 3. Heat that is not reflected directly back onto slab 1 by reflector surface 4 of reflector elements 2 is cooled by means of a liquid, which is conducted in ring line 6. The liquid in the embodiment example is glycol or a mixture of glycol and water. The liquid is conveyed through a ring line 6 by means of a motorized circulating pump 7. It is also possible for a heat accumulator (not shown) to be provided within ring line 6, for keeping the cooling liquid at the desired temperature level.

The majority of the heat radiating from slab 1 is therefore reflected back by the specular reflector surface 4 of reflector elements 2, thereby reducing heat loss from the slab. The portion of the heat that is absorbed by the reflector element is diverted by the illustrated closed circuit cooling system, and is thus released to the environment by means of heat exchanger 3. Reflector element 2 is thereby protected against destruction or oxidation.

The fluid is conducted along the side of reflector surface 4 that faces away from slab 1, in order to absorb heat and cool reflector element 2.

Reflector surface 4 of reflector elements 2 can also be embodied as curved somewhat in the longitudinal or the transverse direction, in order to increase mechanical rigidity.

Scale falls onto reflector elements 2, which are arranged below slab 1. The scale particles are cleaned off periodically by blowing them away using an air flow, a process which is facilitated by the inclined mirror surfaces. It is also possible for a thin metal membrane 8 (configured as a wear part) to be attached as a protective measure in front of the mirror; this membrane is shown on the two lower right reflector elements 2. Alternatively, reflective insulation involving mirrors on the upper side can be combined with a conventional type of absorptive insulation (involving a membrane sheet and/or ceramic insulating fibers) on the lower side between the rollers.

Figure 2:
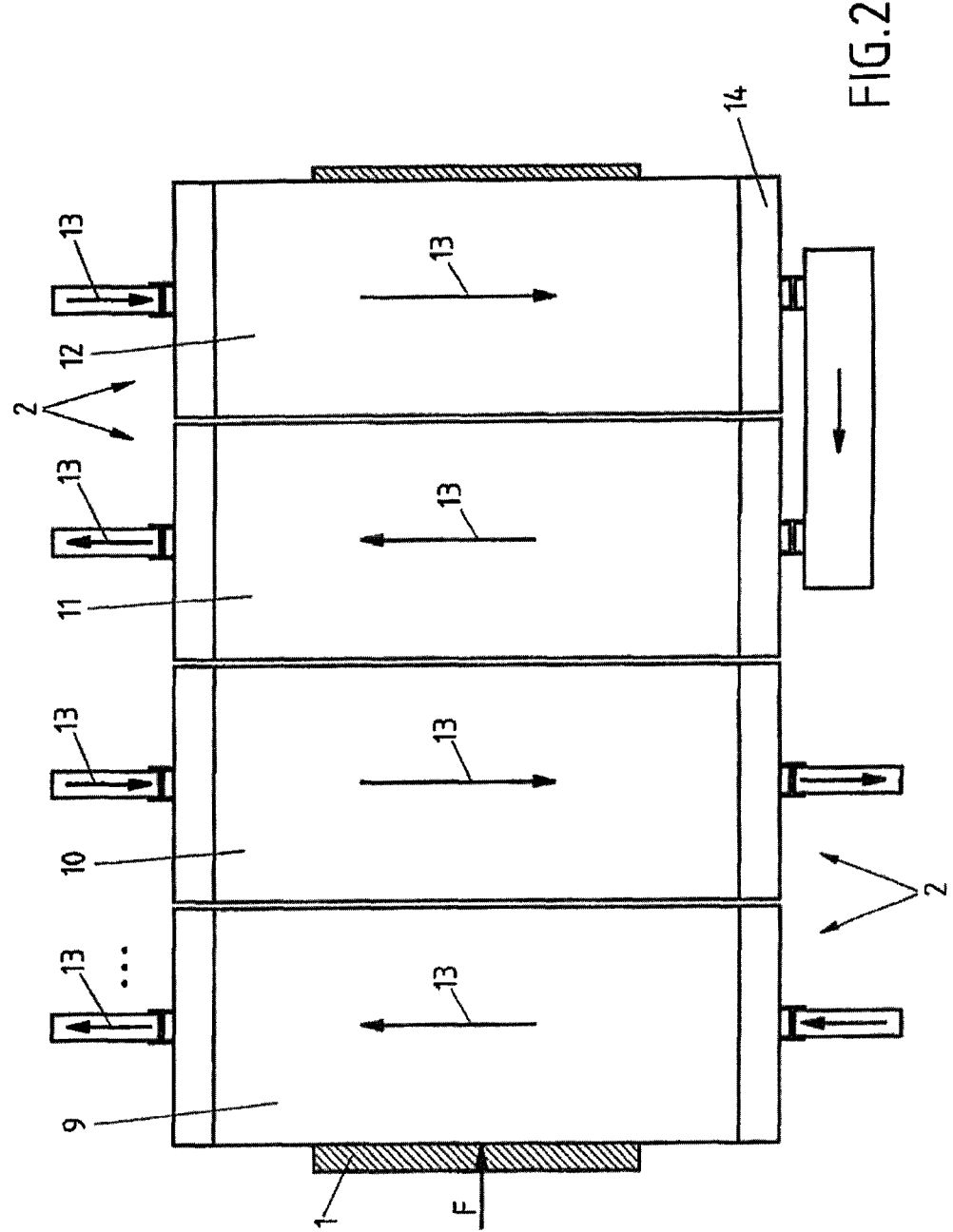
Figure 3:
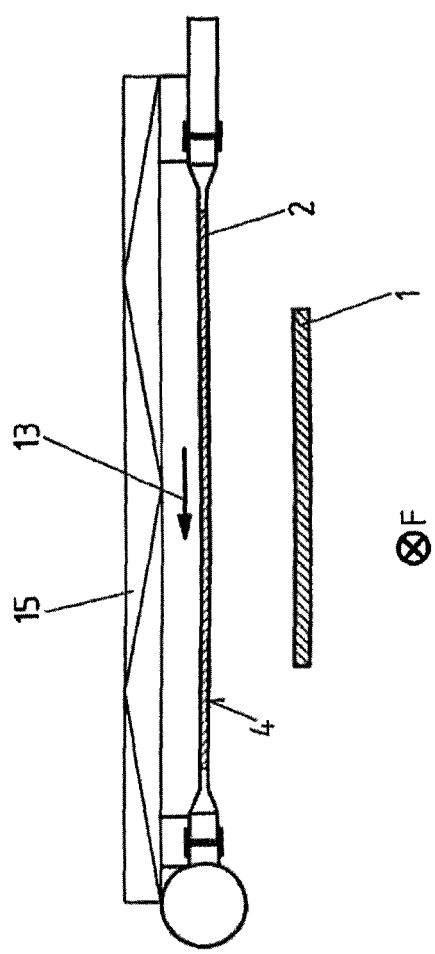

The structural configuration of the mirror segments of the reflective heat-insulating hoods 2 is shown FIG. 2 and FIG. 3. A coolant stream 13 flows through segments 9, 10, 11 and 12. The coolant can be settled in a settling section 14.

The mirror of reflector element 2 is held by a mirror support 15. In this case, the flow passes through the reflector elements during the change from the drive side (AS) to the operating side (BS) and from BS to AS.

Various embodiments of reflector elements, in which one side acts as a mirror, are shown in FIGS. 4*a* to 4*f*.

Figure 4A:

FIG. 4*a* shows a wide rectangular channel, with reflector surface 4 situated on the underside thereof.

Figure 4B:
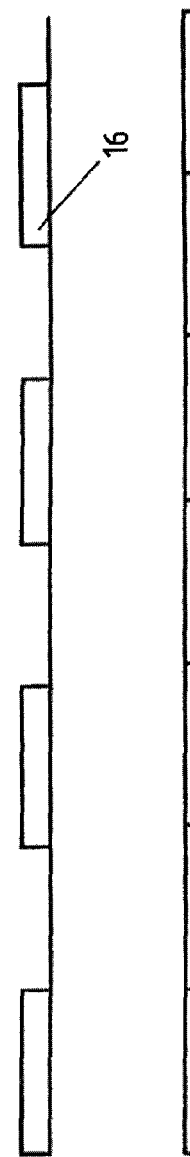

FIG. 4*b* shows a rectangular tube/connector/rectangular tube configuration. The cooling channels are identified as 16.

Figure 4C:

FIG. 4*c* shows a plurality of narrow rectangular channels.

Figure 4D:

FIG. 4*d* shows a rectangular channel with ribs on the hot side (mirror side).

Figure 4E:

FIG. 4*e* shows a pipe/connector/pipe configuration.

Figure 4F:

FIG. 4*f* shows a plate heat exchanger with a corrugated rear wall.

Figure 5:
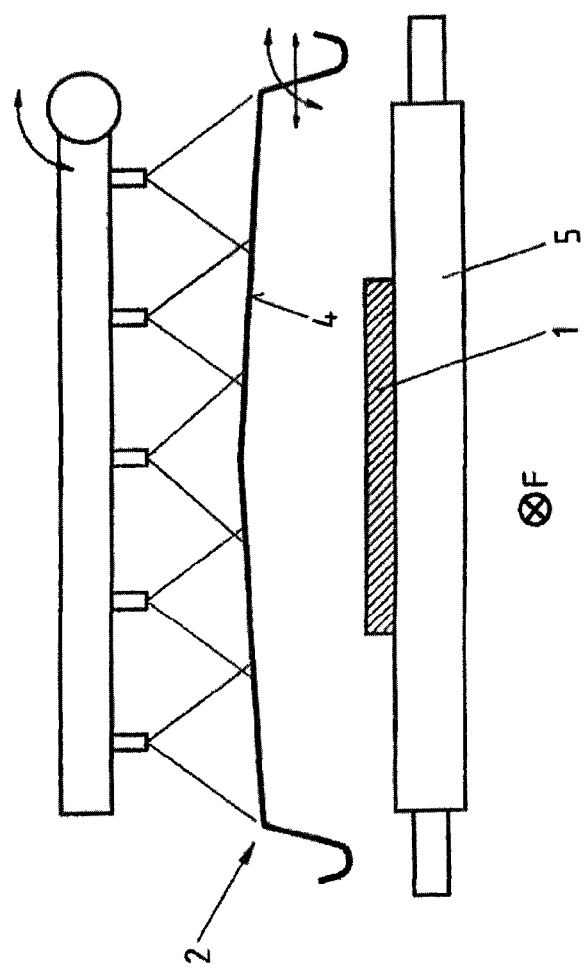

FIG. 5 and FIG. 6 illustrate an alternative reflective heat-insulating hood cooling (mirror cooling). Here, the rear side of the reflector is impinged by a coolant jet. The cooling device can be a spray cooling system, a laminar cooling system, a water pool cooling system or a similar apparatus.

In this case, the coolant is sprayed, for example, from a coolant distribution pipe onto the rear surface of the reflector, and on the reflector runs toward the side, thereby cooling the mirror.

To prevent fluid or steam from wetting the mirror surface or from cooling slab 1 or roller conveyor 5, the coolant is captured, collected and selectively diverted. The reflector (mirror) can be pivoted or moved out of the production line in the same manner as the cooling device.

Optionally, this mirror cooling device may also be used, as needed, as a product cooling system (for example as a roughed strip cooler). In this case, the mirror can also be moved on its own out of the transport line, and the cooling medium (in that case, preferably pure water) can cool the roughed strip, for example.

LIST OF REFERENCE NUMERALS

1 hot material
2 reflector element
3 heat exchanger
4 reflector surface
5 roller conveyor
6 ring line
7 circulating pump
8 metal membrane
9 segment
10 segment
11 segment
12 segment
13 coolant flow
14 coolant settling section
15 mirror support
16 coolant channel
F conveying direction

The invention claimed is:

1. A method for processing hot metal slabs, sheets and strips and similar material (1), wherein the material is guided along a conveying path and is covered and protected against heat loss in the region of the conveying path by at least one reflector element (2), wherein the reflector element (2) is cooled by means of a liquid, characterized in that
   the reflector element includes a reflector material having a reflectivity of greater than 70%,
   that the liquid is glycol or comprises glycol or in that the liquid is alcohol or comprises alcohol, or in that the liquid is thermal oil, and that during cooling, the liquid is heated only to a maximum temperature at which it still will not produce vapor pressure,
   that the liquid is conducted within a closed circuit through the reflector element (2), thereby passing one heat exchanger (3), and
   that the liquid is held at a predefined temperature by controlling a liquid flow rate based on an actual temperature of the reflector element as the liquid passes through the closed circuit, so that the liquid is kept from evaporation, wherein a volumetric flow rate is used as a control variable.

2. The method according to claim 1, characterized in that the liquid is a mixture of glycol and water.

3. The method according to claim 1, characterized in that the liquid is conducted in the closed circuit through a heat accumulator element.

4. The method according to claim 1, characterized in that the temperature of the liquid is controlled in a range of greater than 80° C. and less than 400° C.

5. The method according to claim 4, characterized in that the temperature of the liquid is controlled such that the liquid will not evaporate.

6. The method according to claim 1, characterized in that the heat drawn from the liquid by the heat exchanger (3) is supplied to a secondary process.

7. The method according to claim 1, characterized in that the at least one reflector element (2) is subjected to a cleaning process after a period of use has elapsed.

8. The method according to claim 7, characterized in that the cleaning process comprises a blowing-off of the reflector surface (4) with a gas, in particular air.

9. The method according to claim 7, characterized in that mechanical means, in particular a cleaning brush, are used for cleaning the reflector surface (4).

10. The method according to claim 7, characterized in that liquid and/or chemical cleaning agents, in particular ethanol or nitric acid, or a mixture of cleaning agents and water are used for cleaning the reflector surface (4).

11. The method according to claim 1, characterized in that a material with a thermal radiation range having a wave length between 0.5 and 10 µm is used as the reflector material.

* * * * *